US012805433B2

(12) United States Patent
Wei et al.

(10) Patent No.: US 12,805,433 B2
(45) Date of Patent: Nov. 24, 2026

(54) OUTDOOR POWER MACHINE

(71) Applicant: Greenworks (Jiangsu) Co. Ltd., Changzhou (CN)

(72) Inventors: Qunli Wei, Changzhou (CN); Qinghua Shi, Changzhou (CN); Dongdong Shi, Changzhou (CN); Jiafu Xue, Changzhou (CN)

(73) Assignee: GREENWORKS (JIANGSU) CO. LTD. (CN)

( * ) Notice: Subject to any disclaimer, the term of this patent is extended or adjusted under 35 U.S.C. 154(b) by 413 days.

(21) Appl. No.: 18/558,649

(22) PCT Filed: Sep. 13, 2022

(86) PCT No.: PCT/CN2022/118362

§ 371 (c)(1),
(2) Date: Nov. 2, 2023

(87) PCT Pub. No.: WO2024/055145

PCT Pub. Date: Mar. 21, 2024

(65) Prior Publication Data

US 2025/0098577 A1 Mar. 27, 2025

(51) Int. Cl.

*A01D 34/82* (2006.01)
*A01D 69/02* (2006.01)
(Continued)

(52) U.S. Cl.

CPC ........... *A01D 34/824* (2013.01); *A01D 69/02* (2013.01); *B60K 1/02* (2013.01); *B60L 50/60* (2019.02);
(Continued)

(58) Field of Classification Search

CPC .. A01D 34/824; A01D 69/02; A01D 2101/00; B60L 50/60; B60L 2200/40;
(Continued)

(56) References Cited

U.S. PATENT DOCUMENTS 7,540,134 B1 6/2009 Reich
11,357,170 B1 * 6/2022 Funk ........................ B62D 1/12
(Continued)

FOREIGN PATENT DOCUMENTS

CN 110475468 11/2019
EP 3760021 B1 * 9/2021 ............. G05G 9/047

OTHER PUBLICATIONS

International Search Report and Written Opinion for relating International Patent Application No. PCT/CN2022/118362 issued on Apr. 19, 2023.

*Primary Examiner* — Vivek D Koppikar
*Assistant Examiner* — Scott Lawrence Strickler
(74) *Attorney, Agent, or Firm* — Shumaker, Loop & Kendrick, LLP; Brandon C. Trego

(57) ABSTRACT

An outdoor power machine includes: a chassis; two or more drive wheel assemblies physically mounted to the chassis, each drive wheel assembly coupled to an electric motor; an electrical power pack configured to supply electric energy to the electric motors; one or more steer wheels; and a steering assembly configured to pivot relative to the frame between an inboard use position and an outboard parked position, wherein a steering lever is pivotally mounted to the steering assembly such that it can move in a fore-aft direction to control one of the electric motors.

13 Claims, 15 Drawing Sheets

(51) Int. Cl.

| | |
|---|---|
| ***B60K 1/02*** | (2006.01) |
| ***B60L 50/60*** | (2019.01) |
| ***B62D 1/12*** | (2006.01) |
| ***B62D 11/04*** | (2006.01) |
| *A01D 101/00* | (2006.01) |
| *G01D 5/14* | (2006.01) |

(52) U.S. Cl.
CPC ................ *B62D 1/12* (2013.01); *B62D 11/04* (2013.01); *A01D 2101/00* (2013.01); *B60L 2200/40* (2013.01); *G01D 5/14* (2013.01)

(58) Field of Classification Search
CPC . B60K 1/02; B62D 1/12; B62D 11/04; G01D 5/14
See application file for complete search history.

(56) References Cited

U.S. PATENT DOCUMENTS

| | | | | |
|---|---|---|---|---|
| 2005/0044836 | A1 | 3/2005 | Goto et al. | |
| 2007/0125054 | A1 | 6/2007 | Dong et al. | |
| 2008/0190084 | A1 | 8/2008 | Piontek | |
| 2014/0262630 | A1 | 9/2014 | Borshov et al. | |
| 2019/0274251 | A1* | 9/2019 | Dunbar ................... | B60T 7/102 |
| 2021/0086831 | A1* | 3/2021 | Ikeda ................... | A01D 34/006 |

* cited by examiner

OUTDOOR POWER MACHINE

BACKGROUND OF THE INVENTION

This invention relates generally to components for self-propelled outdoor power machines, outdoor power equipment, and more particularly to a consolidated steering assembly used in self-propelled outdoor power machines.

Various types of outdoor power machines are known. Examples of common machines include lawn mowers and lawn tractors. Some outdoor power machines have an operator seat and are considered “ride-on”, “riders”, or “riding” machines. Others accommodate an operator in a standing position, described as a “stand-on” or “stander” machine. As is conventionally understood, manufacturing efficiencies can be improved when different types of similar equipment have the maximum number of components that can be used between the two types of equipment. Such interchangeability reduces the initial cost of manufacture and the cost of long-term upkeep and maintenance. Manufacturing efficiencies can also be improved when multiple components are provided a consolidated assembly such as a consolidated steering assembly described herein.

Some known outdoor power machines are battery powered. They include a battery pack which provides electrical power for the primary operating components of the machine, such as the drive wheels and mower deck or other powered implements. The battery pack also provides electrical power for controls, displays, and accessories of the machine.

One problem with prior art outdoor power machines is that in conventional standup and ride-on machines, a different steering switch assembly is required in each type of machine.

Another problem with prior art outdoor power machines is that manufacture of such machines requires coordinated assembly of many different parts.

BRIEF SUMMARY OF THE INVENTION

These problems are addressed by a steering assembly configured to be received different types of outdoor power machines.

According to one aspect of the technology described herein, an outdoor power machine includes: a chassis; two or more drive wheel assemblies physically mounted to the chassis, each drive wheel assembly coupled to an electric motor; an electrical power pack configured to supply electric energy to the electric motors; one or more steer wheels; and a steering assembly configured to pivot relative to the frame between an inboard use position and an outboard parked position, wherein a steering lever is pivotally mounted to the steering assembly such that it can move in a fore-aft direction to control one of the electric motors.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
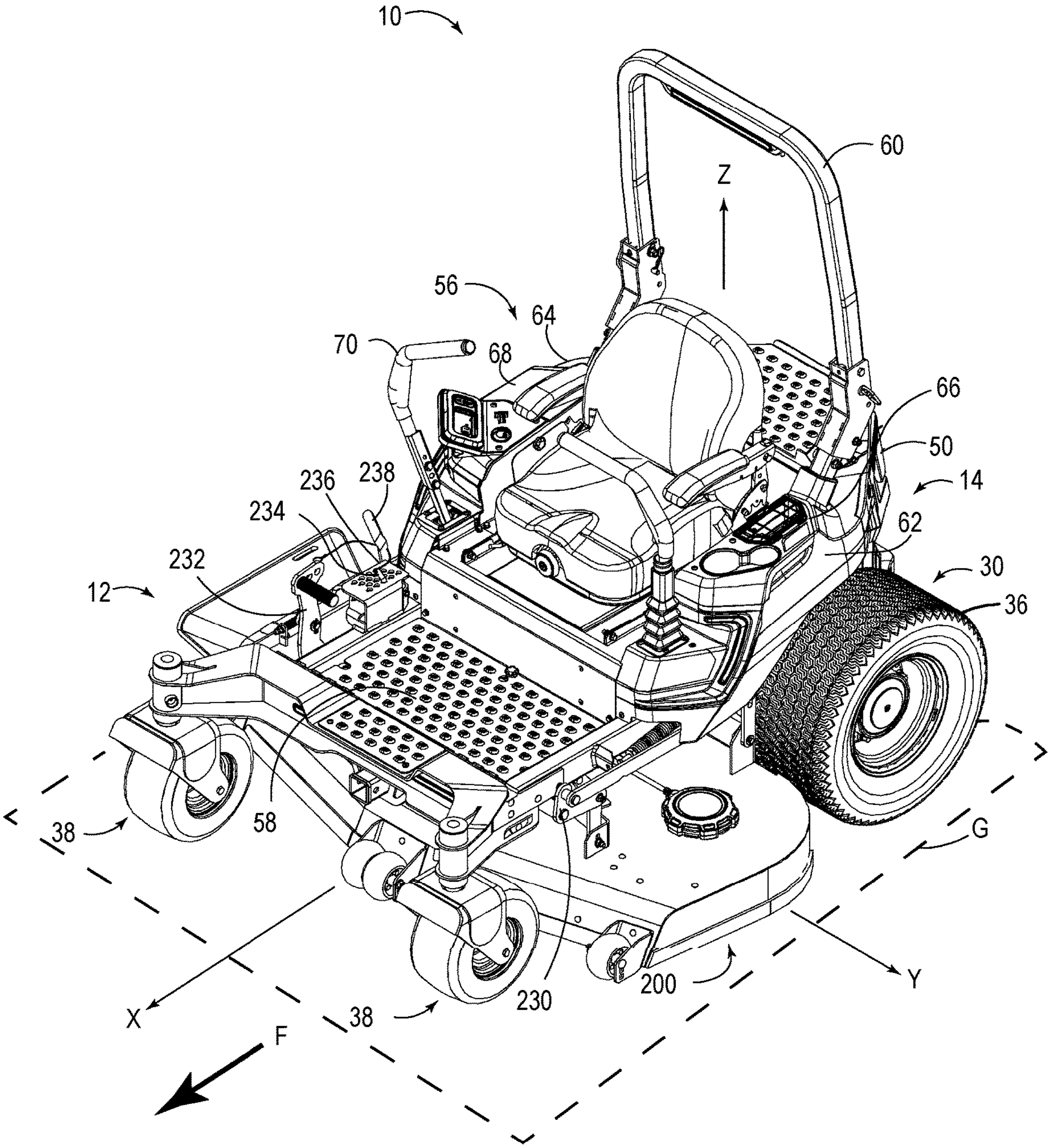
FIG. 1 is a front perspective view of an exemplary ride-on zero-turn outdoor power machine.

Referring to the drawings wherein identical reference numerals denote the same elements throughout the various views, FIGS. 11-15 show a steering assembly 300 for use with representative embodiments of an outdoor power machine 10. The steering assembly 300 is configured to provide control signals relative to a position of steering levers to be described below. The control signals are generated by the inboard and outboard tilt of the steering assembly 300 as a unit relative to the outdoor power machine 10 to which it is mounted and by the position of an associated steering lever relative to the steering assembly 300.

Figure 2:
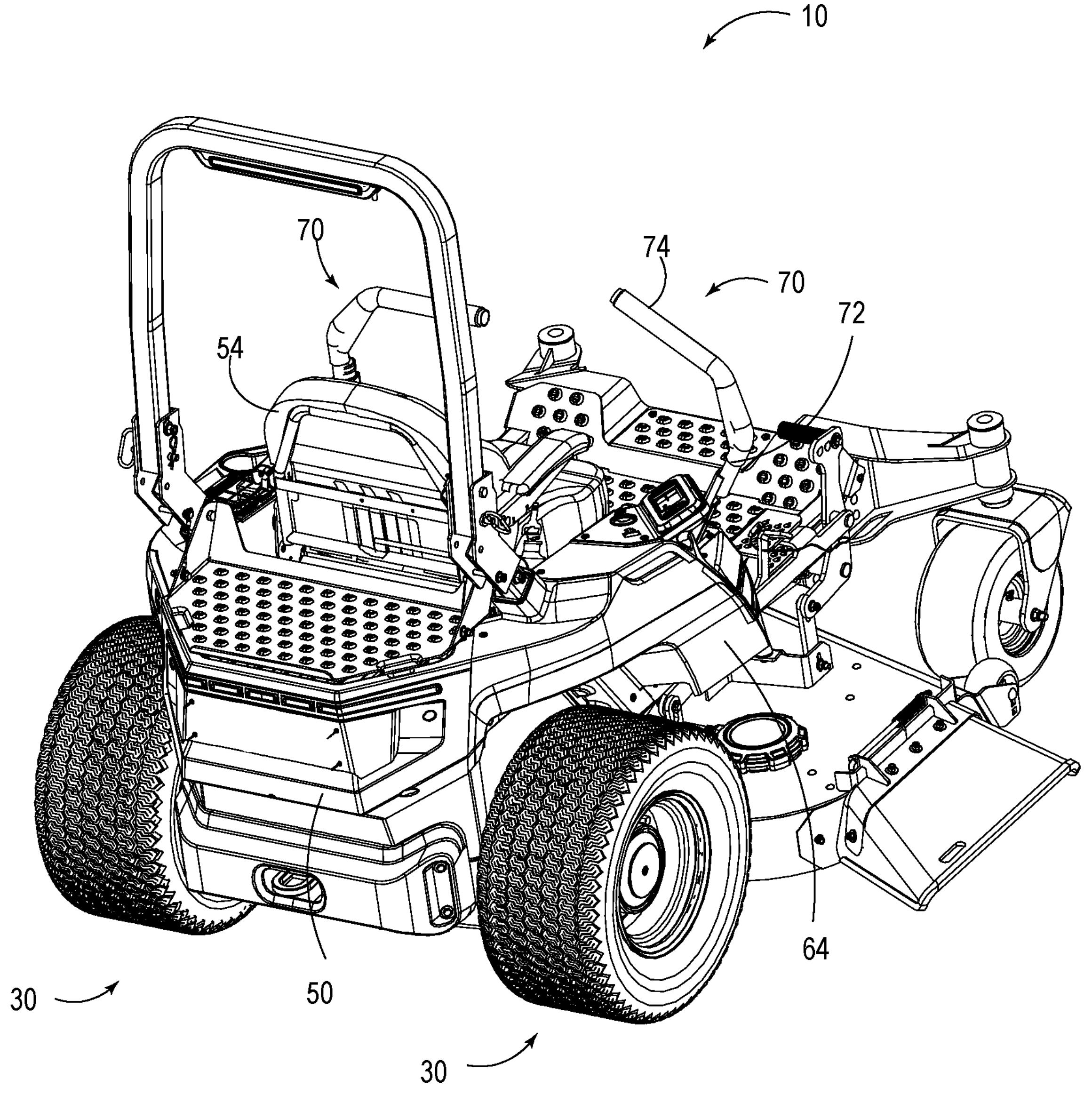
FIG. 2 is a rear perspective view of the machine of FIG. 1.
Figure 3:
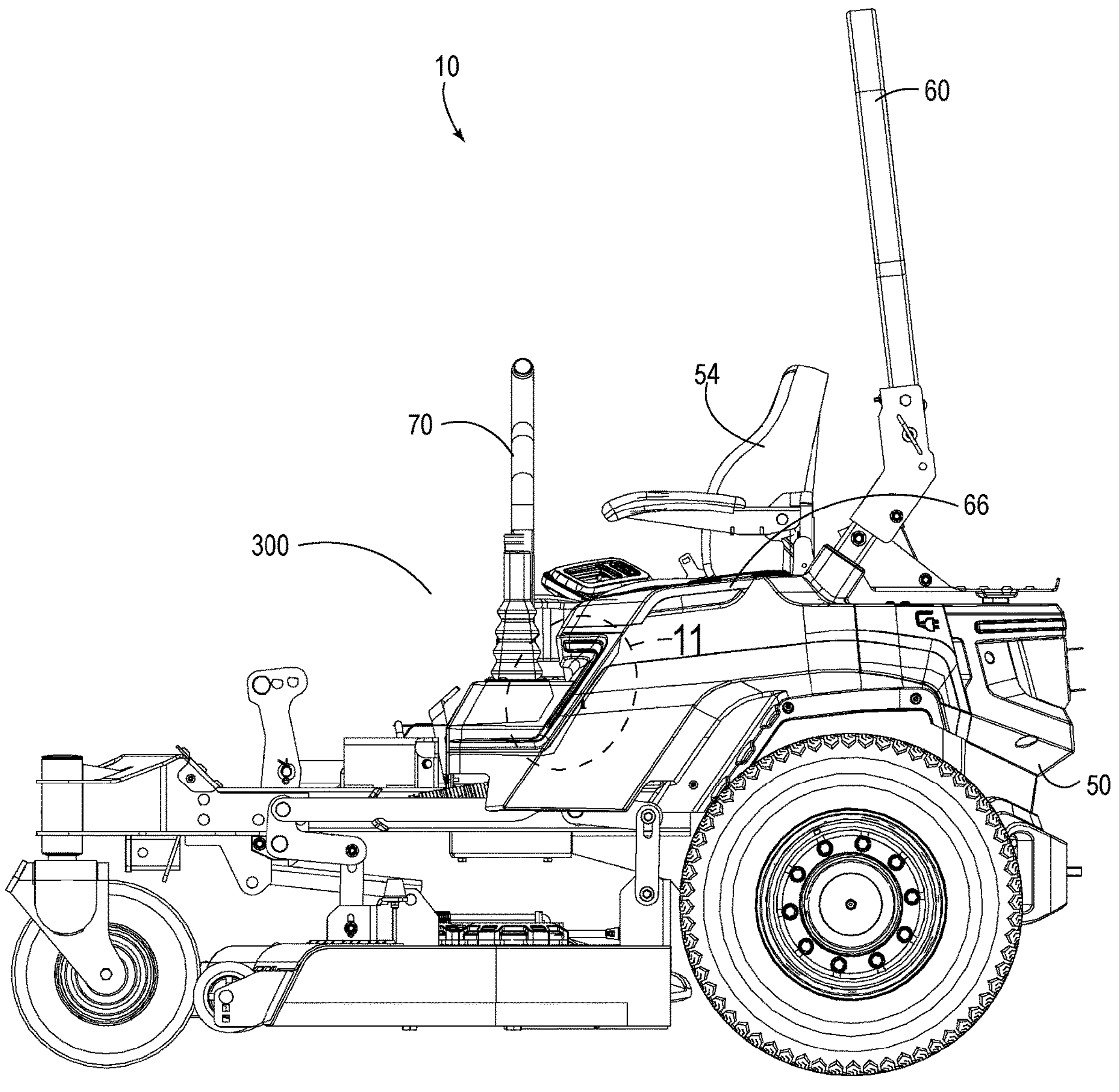
FIG. 3 is a side elevation view of the machine of FIG. 1.

FIGS. 1-3 show a representative embodiment of an outdoor power machine 10. The machine 10 extends along an axial direction (arrow “X”) between a front end 12 and a rear end 14. The points of contact of the wheels of the machine 10 collectively define a ground plane “G”.

It is noted that, as used herein, the terms “axial” and “longitudinal” both refer to a direction parallel to the axis X, while “vertical” refers to a direction perpendicular to the axial direction and to the ground plane G (see arrow “Z” in FIG. 1) and “lateral” refers to a direction mutually perpendicular to the axial and vertical directions (see arrow “Y” in FIG. 1). A primary forward direction of ground travel is shown by the arrow “F” in FIG. 1. These directional terms are used merely for convenience in description and do not require a particular orientation of the structures described thereby.

In the illustrated example, the outdoor power machine 10 is a zero-turn-radius type machine, alternatively referred to as a “zero-turn” machine. This type of machine is capable of changing its direction of travel (heading) without significant forward or backward movement. This is accomplished by differential rotation of drive wheels on opposite sides of the machine 10 to produce a yawing motion. For example, rotating the right-side wheel forward and simultaneously rotating the left-side wheel backward at the same wheel speed (RPM) will cause the machine 10 to yaw (turn) to the left without moving forwards or backwards. Related steering effects may be obtained by rotating drive wheels on opposite sides in different directions and different wheel speeds, by holding one wheel stationary while driving the opposite-side wheel in a chosen direction, or by rotating the wheels on opposite sides in the same direction at different wheel speeds.

The principles described herein are also applicable to a non-zero-turn mower (not shown) using a conventional steering linkage to pivot (steer) some or all of the wheels.

In the example shown in FIGS. 1-3, the machine 10 is a ride-on machine (alternatively referred to as a "rider" or "riding machine").

Figure 4:
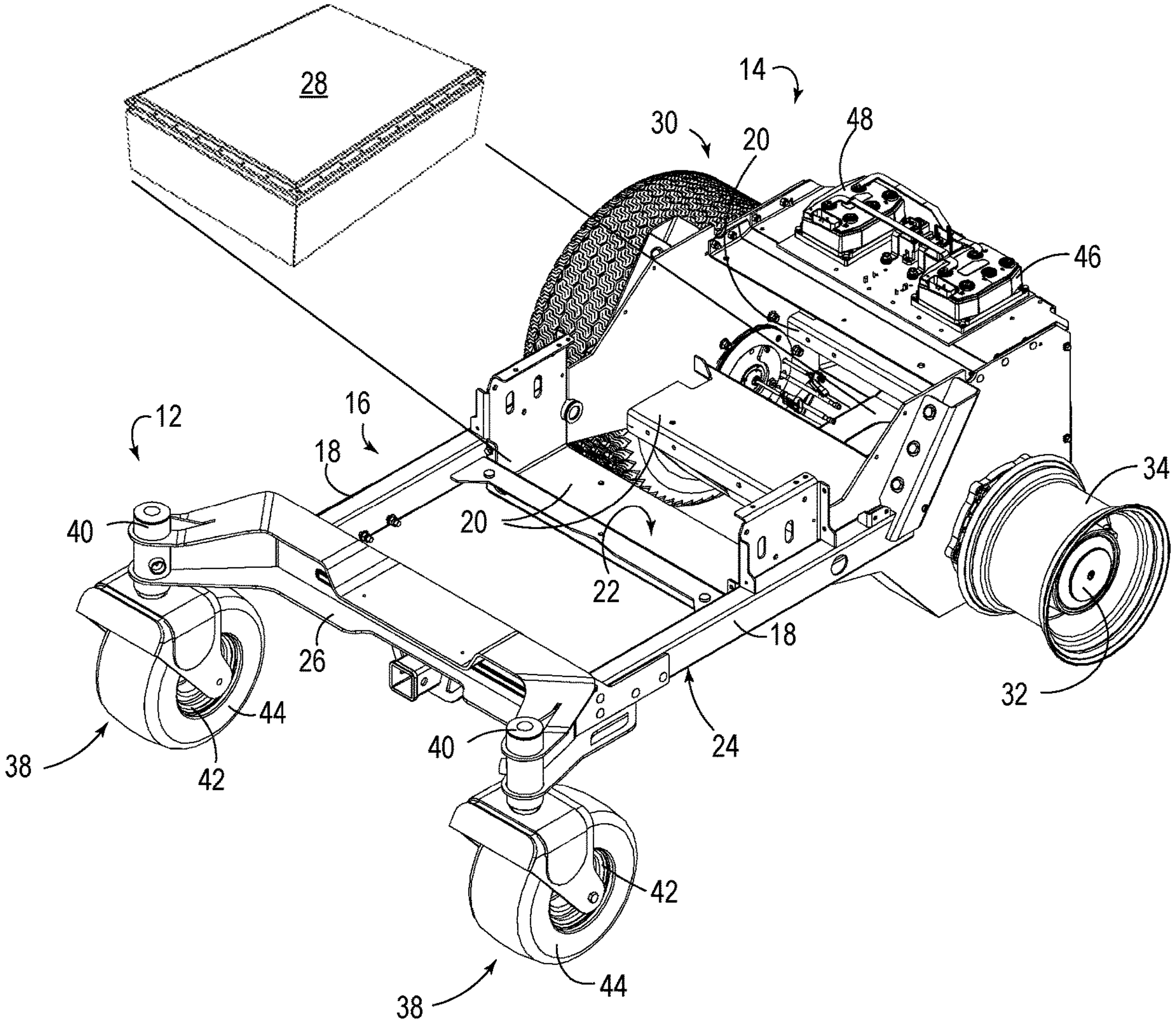
FIG. 4 is a perspective view of a chassis of the machine of FIG. 1.

The machine 10 has a chassis 16 (FIG. 4) which provides structural support as well as mounting locations for the various components of the machine 10. Any material with adequate structural strength may be used to construct the chassis 16. Examples of suitable materials include metals such as aluminum and steel and their alloys. The chassis 16 may be monolithic or may be built up from smaller components, e.g., via fasteners, adhesives, or welding.

The chassis 16 includes a pair of spaced-apart main frame rails 18 extending in a longitudinal direction from the front end 12 of the machine 10 to the rear end 14 of the machine 10. Cross-members 20 interconnect the main frame rails 18. Top surfaces 22 of the cross-members 20 are positioned even with or lower than the bottom surfaces 24 of the main frame rails 18.

A front axle assembly 26 interconnects the main frame rails 18 at the front end 12 of the machine 10.

The machine 10 is equipped with an electric power pack 28 suitable for storing and discharging electrical energy. In the illustrated example, the electric power pack 28 is a storage battery including one or more chemical cells, for example lithium ion cells. Other liquid battery chemistries may be substituted, as well as solid state batteries, capacitors, or similar devices which may exist currently or be later developed. The electric power pack 28 may include ancillary electrical components such as inverters, transformers, voltage converters, relays, circuit breakers, and/or sensors. In the illustrated example, the electric power pack 28 includes at least one set of terminals providing a high voltage output (e.g. 82 V) for operating the primary components of the machine 10, such as the drive wheels and mower deck or other powered implement. It also includes another set of terminals providing a low voltage output (e.g. 12 V) for operating the control systems of the machine 10 as well as certain accessories.

The electric power pack 28 is positioned on the cross-members 20 and may be secured by fasteners, clips, latches, or the like (not shown).

The electric power pack 28 is positioned such that some portion of it is located at or below the bottom surfaces 24 of the main frame rails 18. Stated another way, the electric power pack 28 is positioned "between" the main frame rails 18, rather than sitting above or on top of the main frame rails 18.

The machine 10 is equipped with a drive wheel assembly 30, one on each side. Each drive wheel assembly 30 includes an integral drive hub 32 containing an internal electric motor, gear reduction drive, an optional brake (not separately illustrated), a drive wheel 34, and a tire 36 mounted to the drive wheel 34. It is noted that wheels having a ground-engaging surface, and thus not requiring a separate tire, are known in the art. The integral drive hub 32 is physically mounted to the chassis 16 such that the drive wheel 34 can rotate relative to the chassis 16. As will be described in further detail, the machine 10 is configured such that the wheel speed and direction of rotation can be controlled independently for the left-and right-side drive wheel assemblies 30. In the illustrated example, the drive wheel assemblies 30 are located at or near the rear end 14 of the machine 10. Alternatively, the drive wheel assemblies 30 could be located at or near the front end 12 of the machine 10.

The machine 10 is equipped with left-and right-side steer wheel assemblies 38. Each steer wheel assembly 38 includes a pivot assembly 40, a steer wheel 42, and a tire 44 mounted to the steer wheel 42. It is noted that wheels having a ground-engaging surface, and thus not requiring a separate tire, are known in the art. Each steer wheel assembly 38 is mounted to the chassis 16 such that the steer wheel 42 can rotate relative to the chassis 16 as well as pivot freely about an upright (vertical or near-vertical) axis. The steer wheel assemblies 38 function as casters and therefore passively steer the machine 10. As noted above, the principles described herein are also applicable to a non zero-turn mower (not shown) using a conventional steering linkage to pivot (i.e., actively steer) some or all of the wheels.

The machine 10 is equipped with suitable electrical connections, controls, and switching equipment to permit the operator to control the drive functions of the machine 10. In the illustrated example, the machine 10 includes a left drive motor controller 46 and a right drive motor controller 48. Each of these drive motor controllers 46, 48 includes an electrical power connection to the electric power pack 28 as well as connections to operator controls as described below. Each drive motor controller 46, 48 is operable to receive a command signal from an operator control and to provide electrical power to drive its associated drive wheel assembly 30 at the commanded wheel speed and direction.

The machine 10 includes a body 50 or superstructure positioned above the chassis 16. The body 50 functions to enclose the operating components of the machine 10, to provide the mounting structure for controls and accessories of the machine 10, and to provide a desired external appearance.

The body 50 includes a battery cover assembly 52 which encloses the electric power pack 28.

An operator seat 54 is mounted on top of the battery cover assembly 52. The operator seat 54 may be adjustable in one or more directions, may include retractable armrests, and may include a seatbelt or other restraint for the operator. The battery cover assembly 52 and the operator seat 54 collectively define an "operator station" 56 which functions to support the operator in a position with access to machine controls during operation.

A foot deck 58 is mounted to the chassis 16 forward of the battery cover assembly 52. This serves as a support for the operator's feet. As illustrated, it may be provided with a raised tread structure to increase traction and avoid slippage.

A rollover protection system ("ROPS") 60 is mounted to the body 50 just aft of the operator seat 54. This is a hoop-like structure or rollbar which extends above the operator's head in the seated position. This functions to prevent injury to the operator should the machine 10 rollover in operation. In the illustrated example, the rollover protection system 60 can be folded down or removed to permit operations under low-hanging structures or vegetation, or to make the machine 10 more compact for transportation.

The body 50 includes left and right fenders 62, 64 respectively which flank the left and right sides of the operator seat 54. The left fender 62 is topped by a left console 66 and the right fender 64 is topped by a right console 68.

The body 50 carries one or more operator controls within reach of the operator seat 54. The primary operator controls include a pair of steering levers 70, one for the left side and one for the right side. Each steering lever 70 is generally L-shaped and includes a vertical section 72 pivotally mounted to the body 50 near the forward edge of the operator seat 54, and a horizontal section 74 which extends from the top of the vertical section 72 towards the centerline X of the machine 10.

Each steering lever 70 is pivotally mounted such that it can move in a fore-aft direction to control drive wheel speed. More specifically, the steering lever 70 is spring-loaded to a neutral position which commands drive wheel speed to stop and/or apply a brake. Movement in the forward direction away from the neutral position commands forward wheel rotation, with RPM proportional to steering lever deflection. Movement in the rearward direction away from the neutral position commands reverse wheel rotation, with RPM proportional to steering lever deflection.

Each steering lever 70 is further pivotally mounted so that it can move in a lateral direction between an outboard parking position and a inboard use position.

Optionally, the machine 10 may be equipped with parking switches (not illustrated) which are operable to detect if the steering levers 70 are in the outboard position or the inboard position. The parking switches may be configured such that the machine drive wheel assemblies 30 cannot be operated unless both steering levers 70 are pivoted to the inboard position.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the left or right consoles 68, 70.

The outdoor power machine 10 may be used as follows. First, the operator sits in the operator seat 54 and activates the key switch or main power switch. A blade start/stop switch or other switch is used to turn on mowing blades or other powered implement, and the implement is adjust to an operating position, such as a desired cutting height for mowing. The steering levers 70 are moved from the outboard parking position to the inboard use position. The operator then uses the steering levers 70 to drive the outdoor power machine 10 in the desired direction while mowing or other implement operation takes place. It will be understood from the above description that manipulation of the steering levers 70 is sufficient to control forward and aft movement of the outdoor power machine 10, as well as braking and steering.

FIGS. 5-8 illustrate another exemplary embodiment of an outdoor power machine 110. This embodiment of the machine 110 is a stand-on machine (alternatively referred to as a "stander"). The overall construction of the machine 110 is similar to the machine described above. Elements of the machine 110 not explicitly described may be taken to be identical to the machine 110 described above.

The machine 110 has a chassis 116 including main frame rails 118 extending in a longitudinal direction from a front end 112 of the machine 110 to a rear end 114 of the machine 110. Cross-members 120 interconnect the main frame rails 118. A front axle assembly 126 interconnects the main frame rails 118 at the front end 112 of the machine 110.

The machine 110 is equipped with an electric power pack 128 as described above.

The machine 110 is equipped with left-and right-side drive wheel assemblies 130. Each drive wheel assembly 130 includes an integral drive hub 132 containing an electric motor, a gear reduction drive, and an optional brake (not separately illustrated), a drive wheel 134, and a tire 136 mounted to the drive wheel 134. It is noted that wheels having a ground-engaging surface, and thus not requiring a separate tire, are known in the art. In the illustrated example, the drive wheel assemblies 130 are located at or near the rear end 114 of the machine 110. Alternatively, the drive wheel assemblies 130 could be located at or near the front end 112 of the machine 110.

The machine 110 is equipped with left-and right-side steer wheel assemblies 138. Each steer wheel assembly 138 includes a pivot assembly 140, a steer wheel 142, and a tire 144 mounted to the steer wheel 142. It is noted that wheels having a ground-engaging surface, and thus not requiring a separate tire, are known in the art. Each steer wheel assembly 138 is mounted to the chassis 116 such that the steer wheel 142 can rotate relative to the chassis 116 as well as pivot freely about an upright (vertical or near-vertical) axis. The steer wheel assemblies 138 function as casters and therefore passively steer the machine 110. As noted above, the principles described herein are also applicable to a non zero-turn mower (not shown) using a conventional steering linkage to pivot (i.e., actively steer) some or all of the wheels.

The machine 110 is equipped with suitable electrical connections, controls, and switching equipment to permit the operator to control the drive functions of the machine 110. the machine 110 includes a left drive motor controller and a right drive motor controller (not visible in the figures). Each of these drive motor controllers includes an electrical power connection to the electrical power pack 128 as well as connections to operator controls as described below. Each drive motor controller is operable to receive a command signal from an operator control and to provide electrical power to drive its associated drive wheel assembly 130 at the commanded wheel speed and direction.

The machine 110 includes a body 150 or superstructure positioned above the chassis 116.

The body 150 includes a battery cover assembly 152 which encloses the electric power pack 128. A control pedestal 154 is mounted on top of the battery cover assembly 152.

A foot deck 158 is mounted to the chassis 116 aft of the battery cover assembly 152. This serves as a support for the operator's feet. As illustrated, it may be provided with a raised tread structure to increase traction and avoid slippage. The battery cover assembly 152, the control pedestal 154, and the foot deck 158 collectively define an "operator station" 156 which functions to support the operator to provide access to machine controls during operation.

The body 150 includes left and right fenders 162, 164 respectively which flank the left and right sides of the control pedestal 154. The left fender 162 is topped by a left console 166 and the right fender 164 is topped by a right console 168.

The body 150 carries one or more operator controls within reach of the operator station 156. The primary operator controls include a pair of steering levers 170, one for the left side and one for the right side. Each steering lever 170 is generally L-shaped and includes a vertical section 172 pivotally mounted to the control pedestal 154, via a hinged bracket 314 (discussed further below) and a horizontal section 174 which extends from the top of the vertical section 172 towards the centerline X of the machine 110. Each steering lever 170 is pivotally mounted such that it can move in a fore-aft direction to control drive wheel speed as described above.

Each steering lever 170 is further pivotally mounted so that it can move in a lateral direction between an outboard parking position and a inboard use position. Optionally, the machine 110 may be equipped with parking switches as described above.

Referring now to FIGS. 11-15, there is provided the steering assembly 300, as referenced above. Each side of the control pedestal 154 is configured to receive a steering assembly 300.

Each steering assembly 300 is configured to be attached to either of a steering lever 70 and 170. For clarity, the discussion of assembly 300 below is made relative to steering lever 170. Steering lever 70 and 170 are similar and analogous such that the relative connections and positions of steering lever 70 can be understood from the description of steering lever 170. Steering assembly 300 is configured to provide for the movement of steering lever 170 relative to its respective side, left or right, of control pedestal 154.

Figure 13:
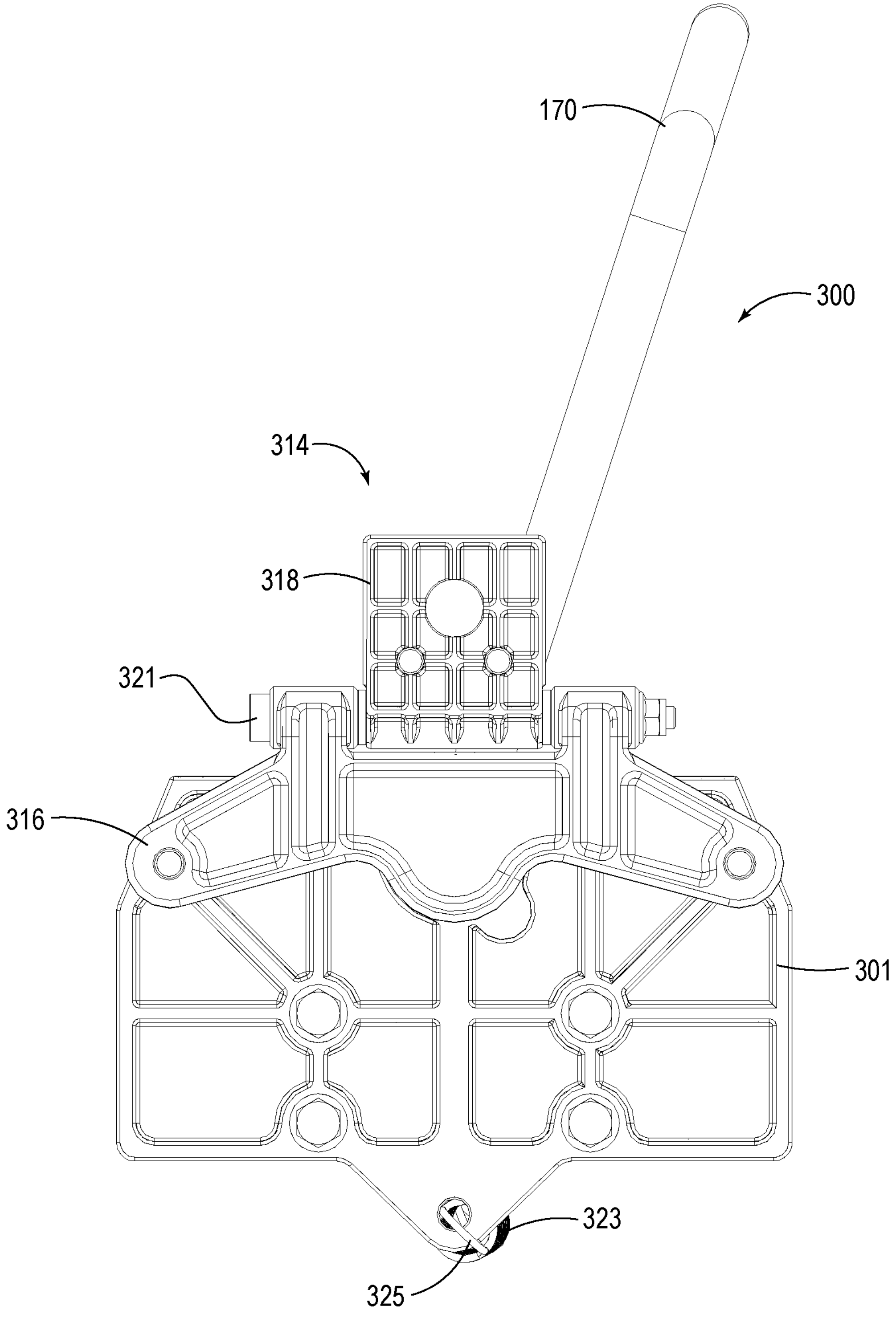
FIG. 13 is an outboard view looking inboard of the switch assembly shown in FIG. 11.
Figure 14:
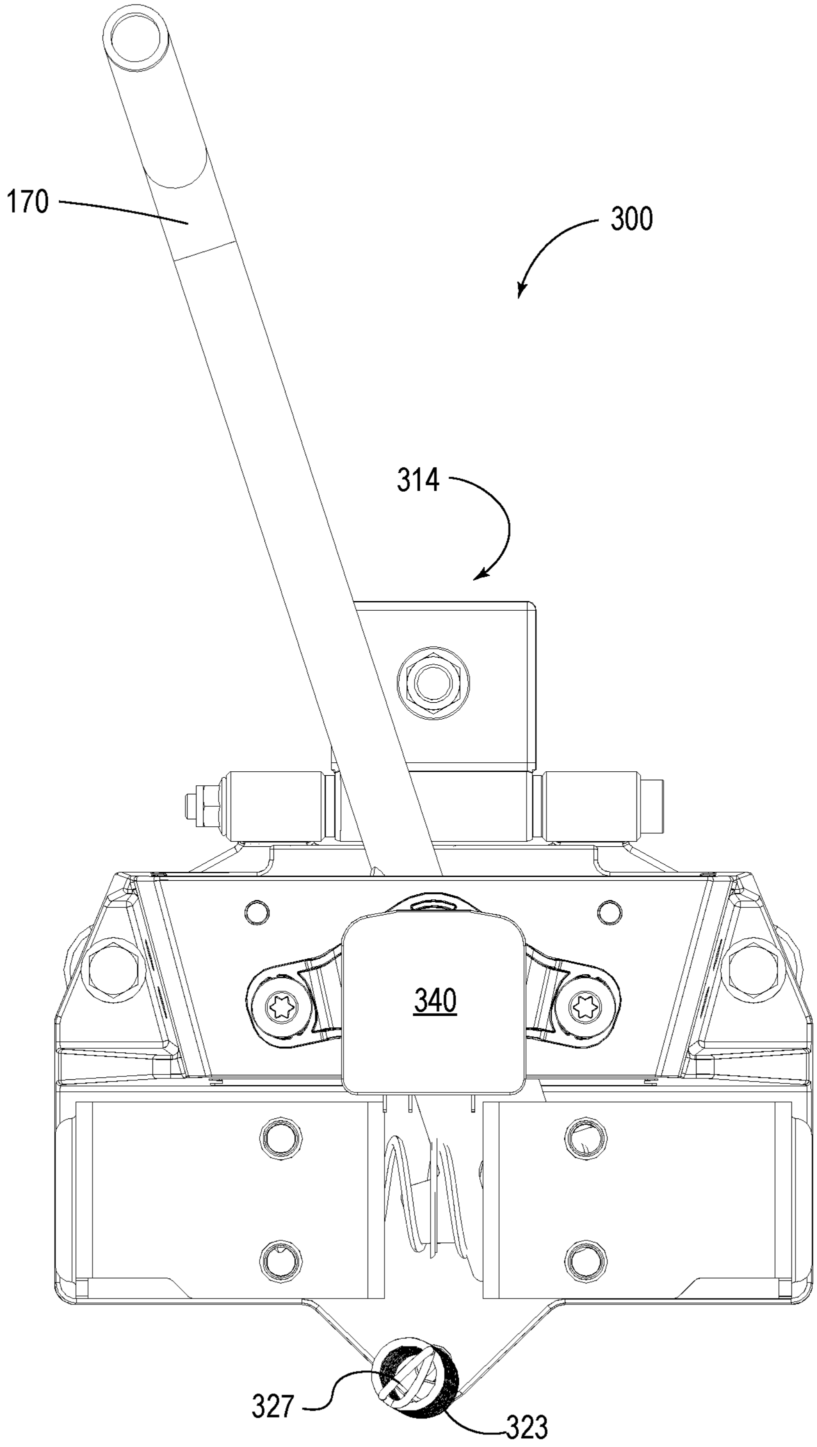
FIG. 14 is an inboard view looking outboard of the switch assembly shown in FIG. 11.
Figure 15:
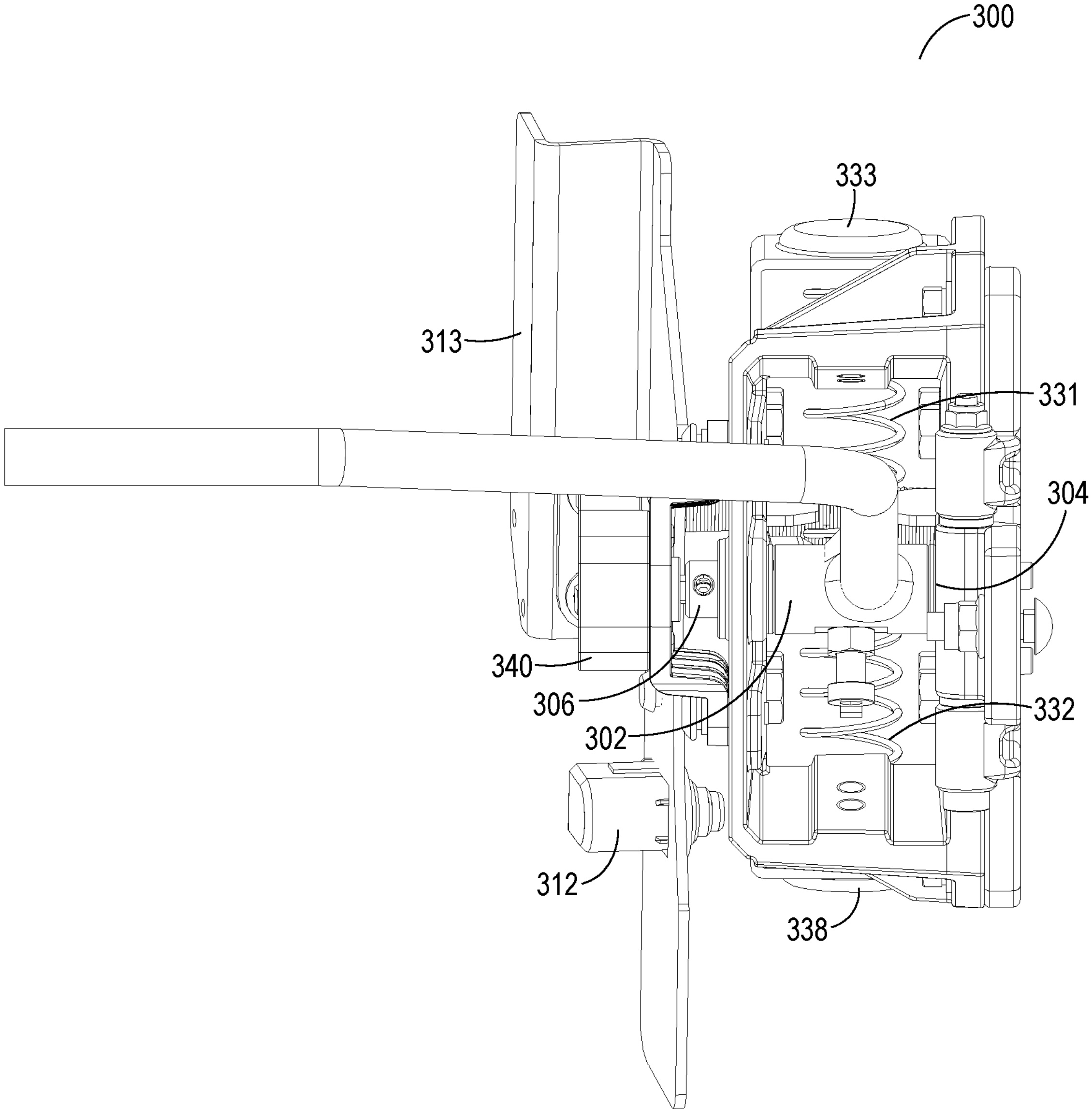
FIG. 15 is a top view of the switch assembly shown in FIG. 11.

The steering assembly 300 includes a body 301 and an axle 302. the axle 302 extends from an outboard end 304 to an inboard end 306. The outboard end 304 and the inboard end 306 are pivotally positioned within a trunnion defined by the body 301 (FIG. 13). The axle 302 is configured to extend through a steering lever 170.

Figure 11:
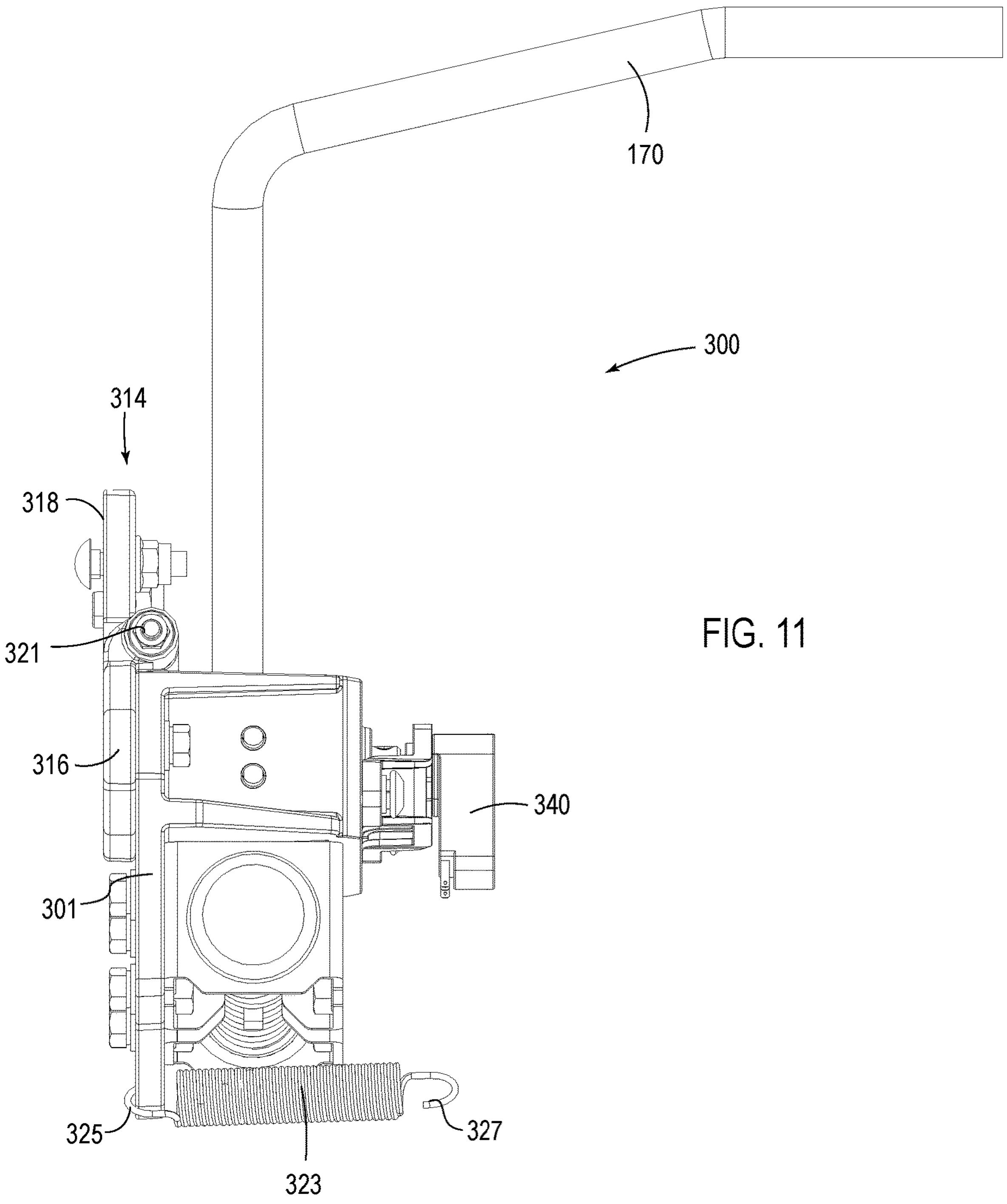
FIG. 11 is a side plan view of a portion of a switch assembly attached to a steering lever 170.
Figure 12:
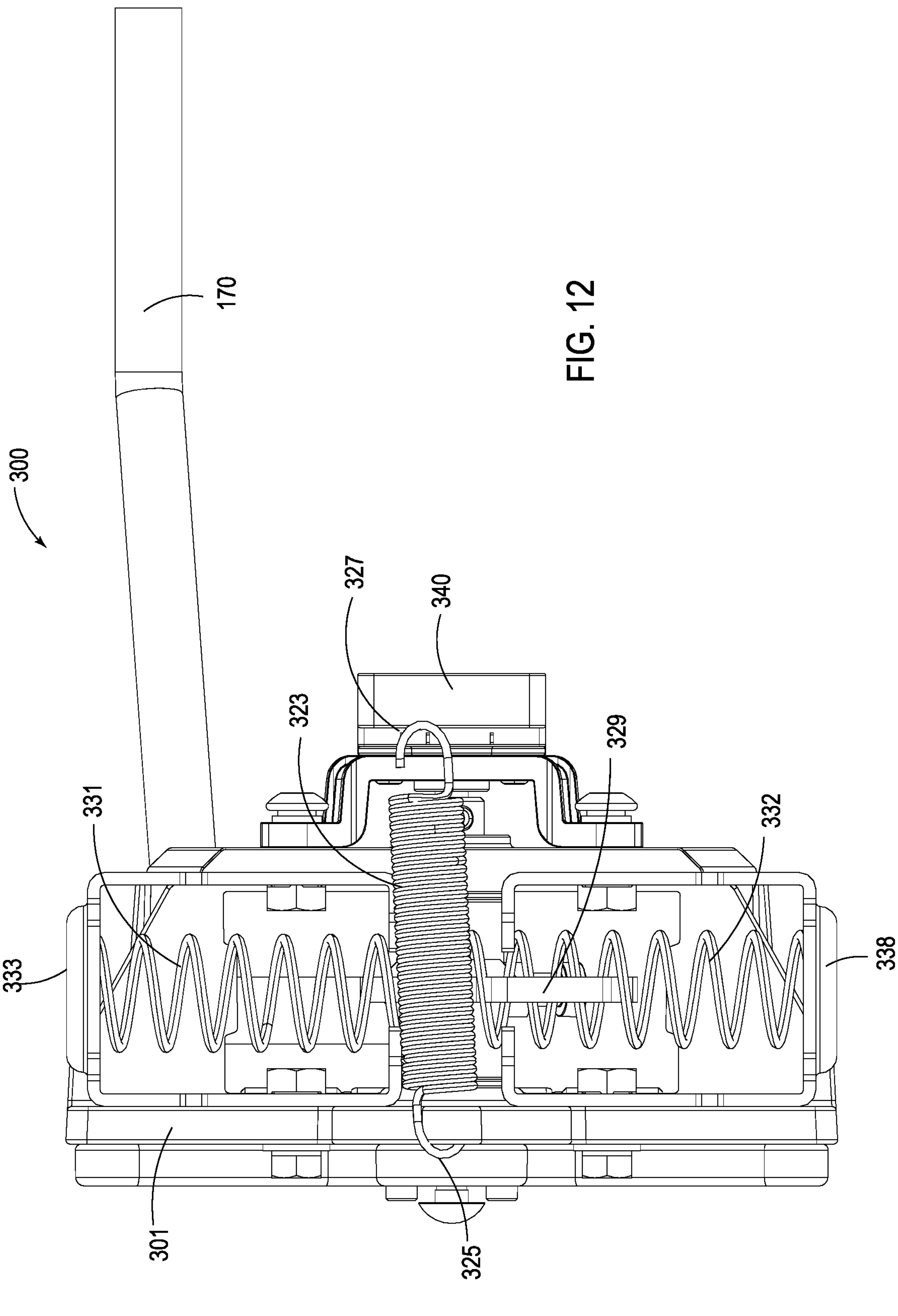
FIG. 12 is a bottom view of a portion of the switch assembly shown in FIG. 11.

The hinged bracket 314 is attached to the body 301 by a first arm 316. The hinged bracket 314 is attached to the control pedestal 154 by a second arm 318. The first arm 316 and the second arm 318 are connected by a hinge pin 321 such that the first arm 316 and the second arm 318 are configured to pivot relative to each other. In this manner, the steering assembly 300 is configured to pivot relative to the control pedestal 154 (or other fixed portion of the chassis 16 or body 50 of the outdoor power machine 110) between the outboard parked position and the inboard use position. As shown in FIG. 11, the steering assembly 300 is in the inboard use position.

When the steering assembly 300 is in the outboard parking position a magnetic sensor 312 (or other suitable sensor or switch), mounted to structure 313 of the machine, is configured to generate a signal indicative of parking. When the steering assembly 300 is in the inboard use position, the magnetic sensor 312 is configured to generate a signal indicative of use. The magnetic sensor 312 is electrically connected to the operator controls or a suitable control subassembly (not separately illustrated).

A parking spring 323 has a first end 325 connected to the body 301 at a lower end thereof and a second end 327 connected to the control pedestal 154. The parking spring 323 is configured such that steering assembly 300 is biased to be in the first parking position.

A pair of balancing springs are opposingly attached to a balancing arm 329 that extends from a steering lever 170. In this regard, a first balancing spring 331 extends between the balancing arm 329 and a first side 333 of the body 301. Correspondingly, a second balancing spring 332 extends between balancing arm 329 and a second side 338 of the body 301. The first balancing spring 331 and the second balancing spring 332 are configured such that the balancing arm 329 and the associated steering lever 170 is biased to a neutral position. In this regard, when force is removed from the steering lever 170 the balancing arm 329 and the associated steering lever return to the neutral position.

The position of the balancing arm 329 is determined by the sensor 340. The sensor 340 is configured to generate a signal indicative of the position of the balancing arm 329 that is transmitted to the control system as is generally understood. In this regard, the signal generated by the sensor 340 can be analog in which case the position is indicated proportionally to the total range of the signal. In other embodiments, the signal generated by the sensor 340 can be digital in which the position is determined by the value of the digital signal. No dampers are provided. In this regard there is no device to affect the response of the balancing arm to a force applied to the associated steering lever 170 other than the first balancing spring 331 and the second balancing spring 333.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the control pedestal 154 or to the left or right consoles 166, 168.

Any of the outdoor power machines described herein may be may be equipped with one or more implements, defined generally as a device attached to or carried by the machine and operable to cut, shape, load, lift, move, or transport material. Nonlimiting examples of implements include mowing decks, plows, disks, scarifiers, rippers, aerators, dethatchers, blades, buckets, scrapers, or blowers.

Figure 9:
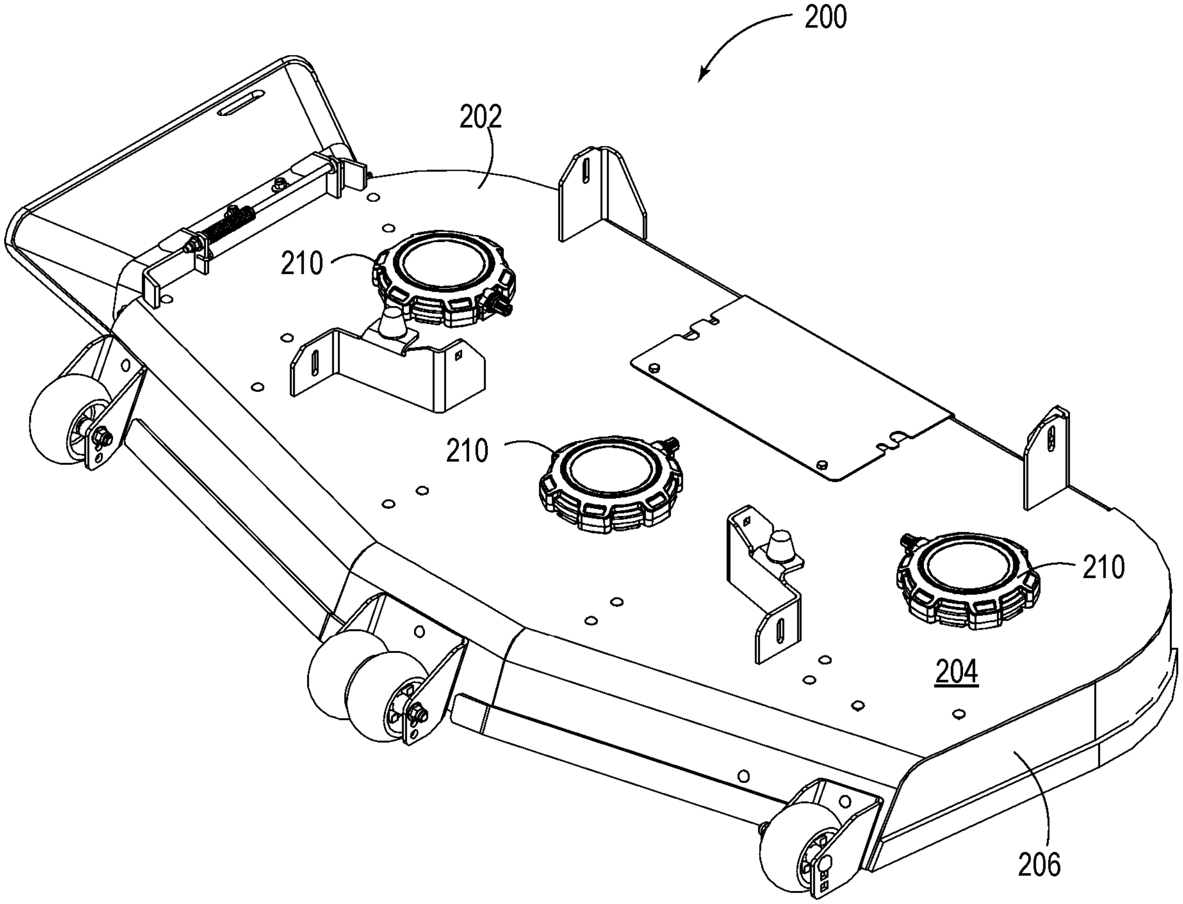
FIG. 9 is a perspective view of an exemplary mowing deck.
Figure 10:
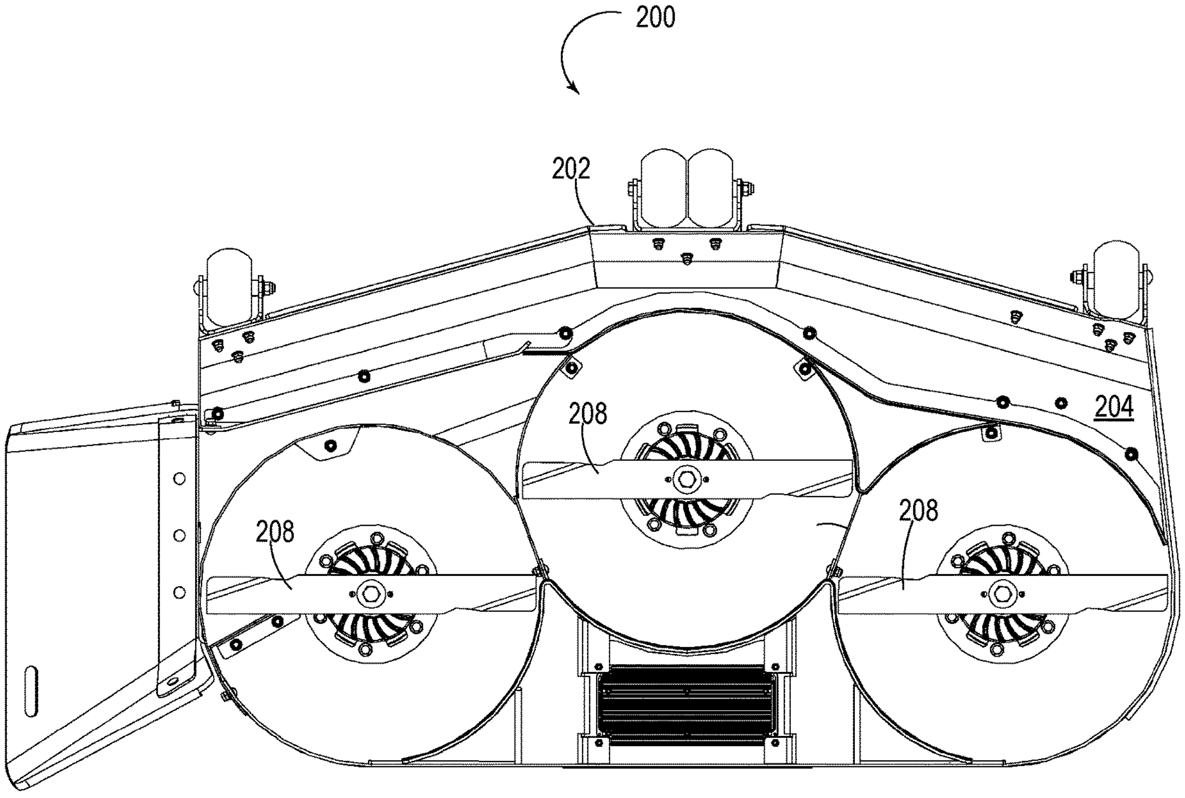
FIG. 10 is a bottom plan view of the mowing deck of FIG. 9.

In the illustrated example, the machine 10 or 110 is equipped with a mowing deck assembly 200 (FIGS. 9, 10). It includes a deck 202 which is an open-bottomed enclosure including a top panel 204 and a peripheral wall 206.

The deck 202 has a nominal designated width which may be selected to provide a desired cutting swath. Non-limiting examples of suitable deck widths include 48 inches, 52 inches, 60 inches, or 72 inches.

One or more mowing blades 208 are rotatably mounted on the underside of the top panel 204. The mowing blades 208 are positioned in a side-by side configuration such that their tips will not collide in operation. The mowing blades 208 may be positioned to have some overlap in at least one dimension so as to prevent un-mowed strips during mower operation. The dimensions of the individual mowing blades 208 are selected to provide adequate structural strength at selected operating speed, (e.g. 3600 RPM). Generally, the size of the individual mowing blades 208 is equal to the deck width divided by the number of mowing blades 208, with some additional diameter provided to accommodate for swath overlap. For example, a deck 202 having a nominal width of 60 inches may use three mowing blades 208 each having a diameter of 20.5 inches.

Means are provided for driving the mowing blades 208. Nonlimiting examples of suitable drive methods include mechanical, hydraulic, or electrical devices. In the illustrated example, each mowing blade 208 is directly driven by its own individual electric blade motor 210.

The mowing deck assembly 200 is connected to the chassis via a deck lift. The deck lift is operable to position the mowing blades 208 at a preselected distance above the ground plane G of the machine. Typical examples include a cutting height in the range of approximately 1 inch to approximately 6 inches. The deck lift is also operable to lift the mowing deck assembly 200 well above any intended cutting height so that the machine can traverse obstacles, travel along a road to a worksite, or be loaded or unloaded from a trailer or storage building. This is referred to as a "travel position".

In the example shown in FIGS. 1-4, a deck lift 230 includes a foot pedal 232 to raise the deck lift 230. A removable pin 234 is insertable into a selected hole in a blade height adjuster 236. The position of the pin 234 determines a cutting height by blocking the deck lift 230 at a specific position. An uplock lever 238 is provided to selectively lock and release the deck lift 230 in the travel position.

Figure 5:
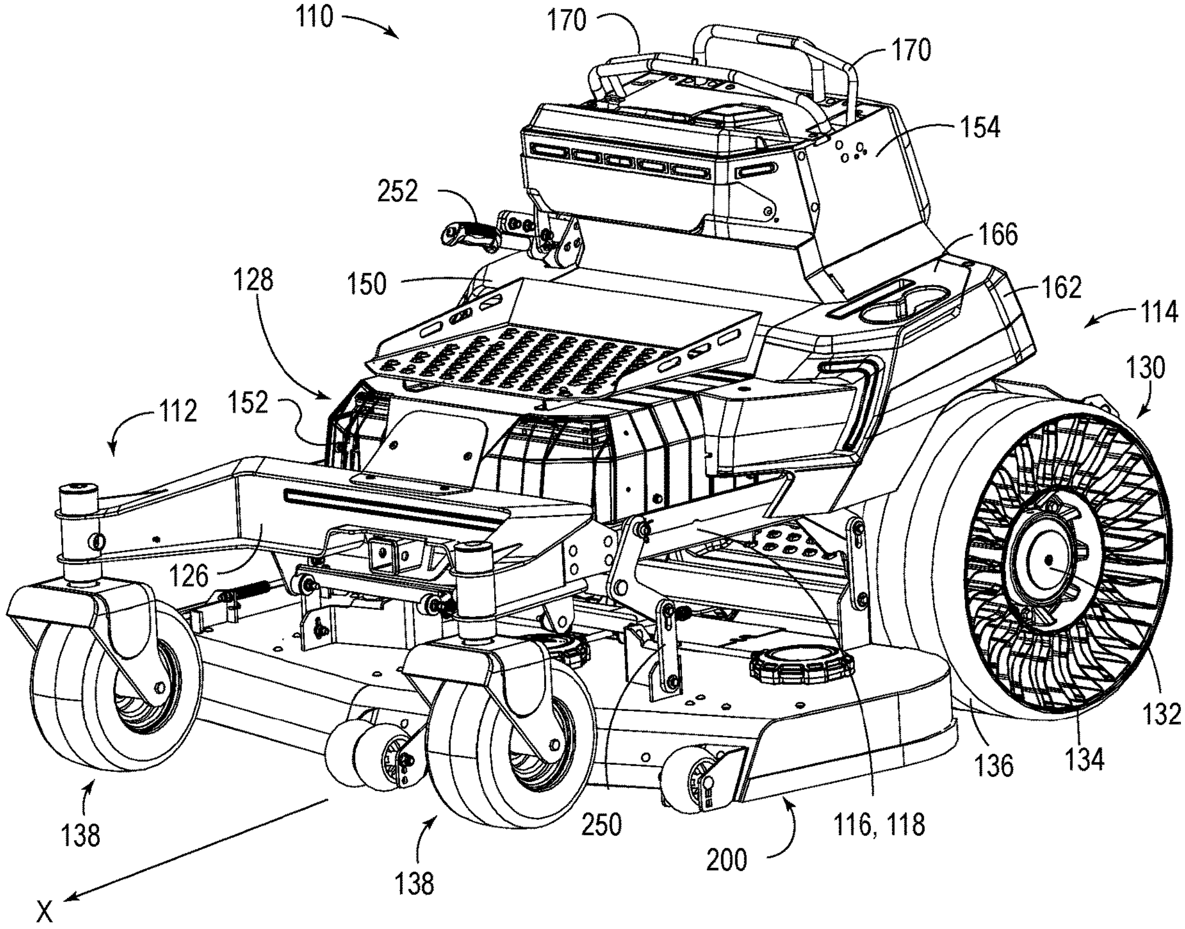
FIG. 5 is a front perspective view of an exemplary stand-on zero-turn outdoor power machine.
Figure 6:
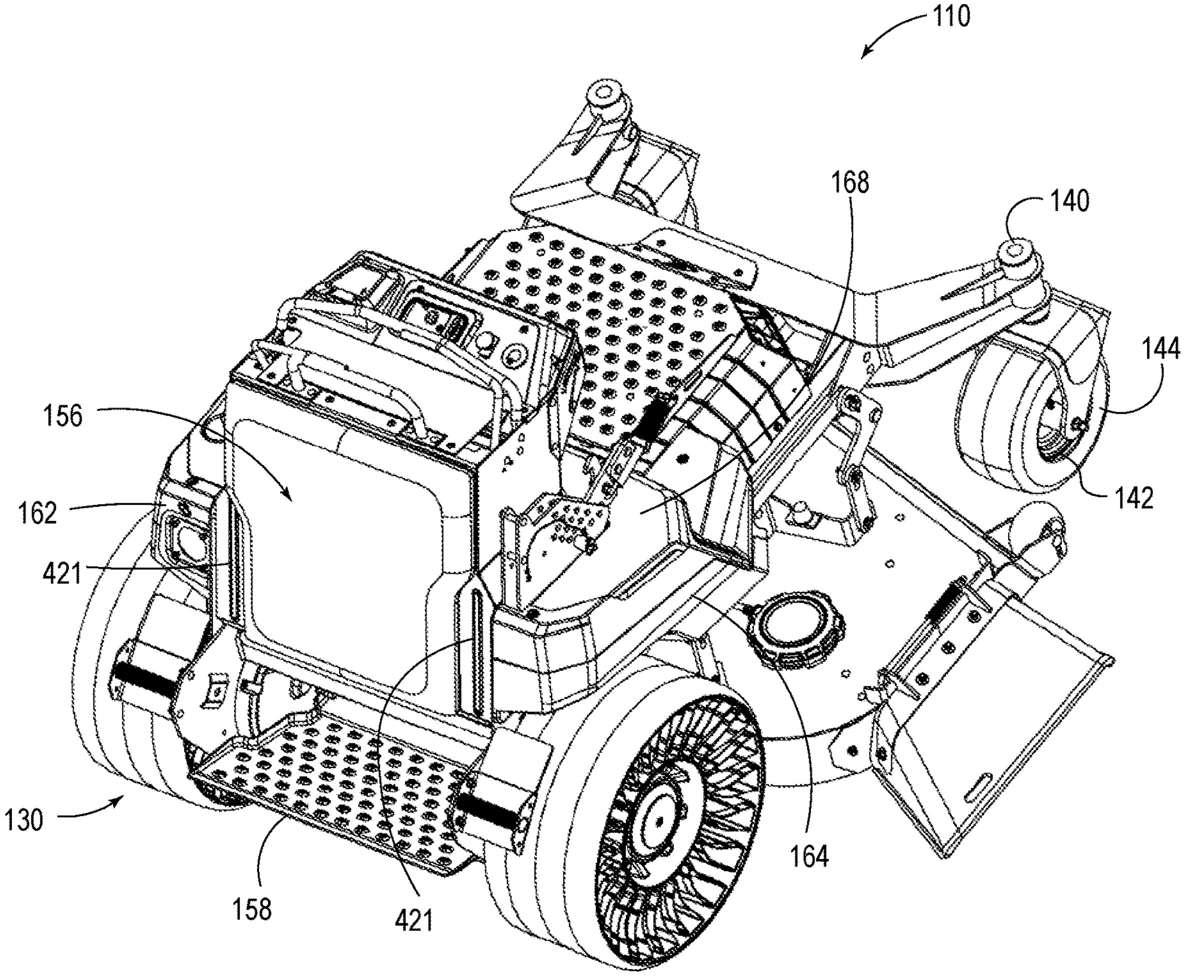
FIG. 6 is a rear perspective view of the machine of FIG. 5.
Figure 7:
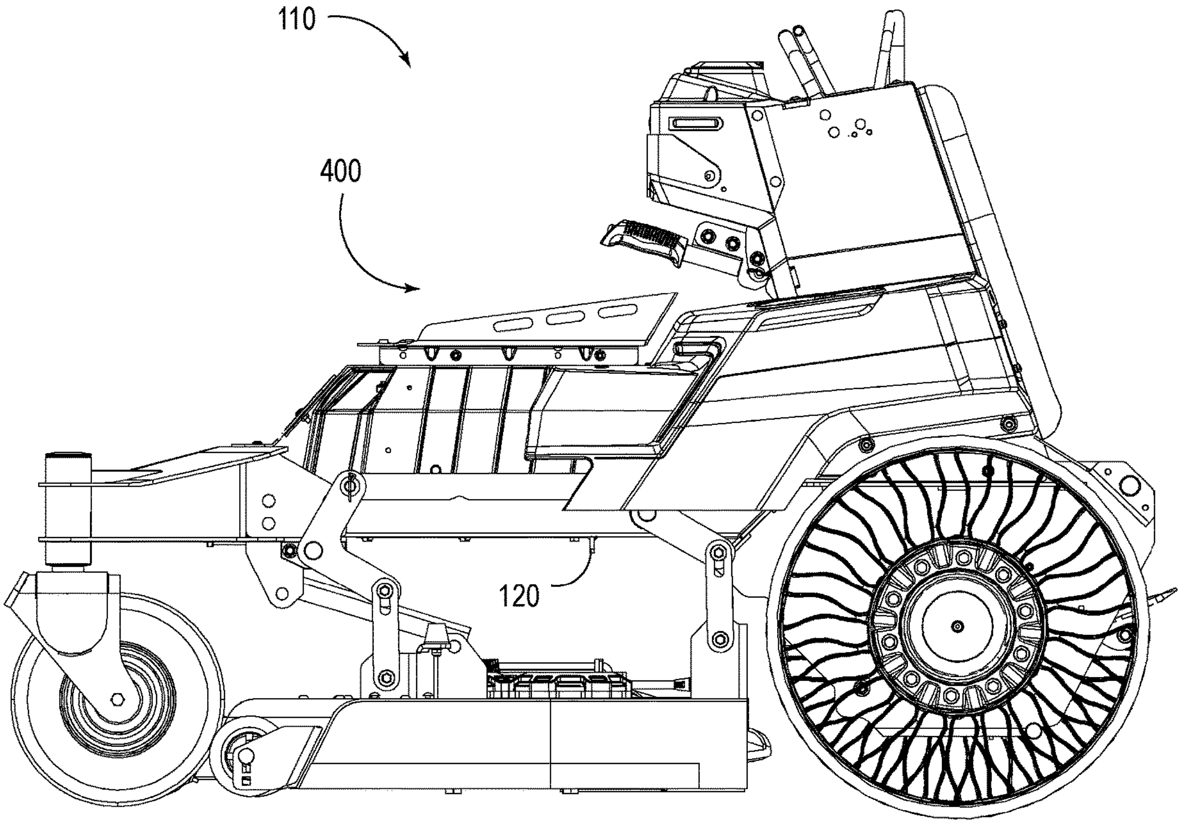
FIG. 7 is a side elevation view of the machine of FIG. 5.
Figure 8:
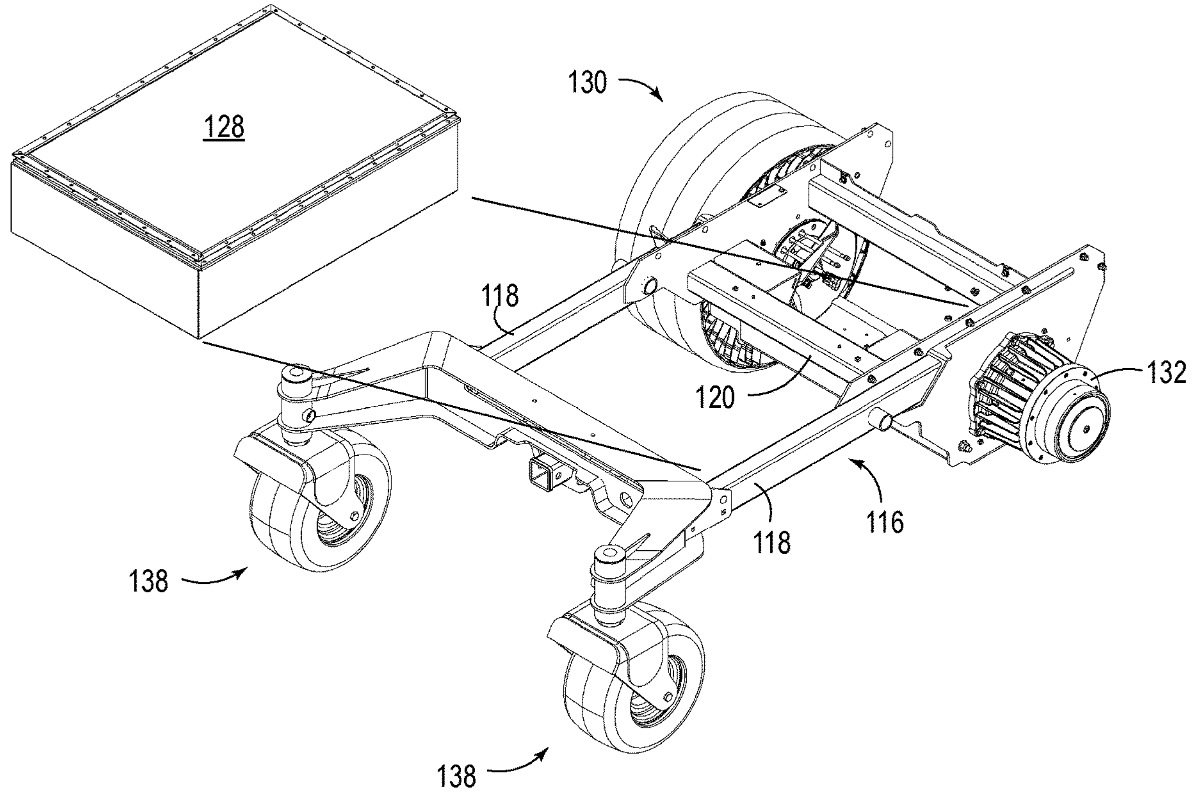
FIG. 8 is a perspective view of a chassis of the machine of FIG. 5.

In the example shown in FIGS. 5-7, the mowing deck assembly 200 is connected to the chassis 116 via a deck lift 250. The deck lift 250 is similar to the deck lift 230 described above, the primary difference being that is operated by a hand lever 252 as opposed to a pedal.

The machine described herein has advantages over prior art machines. In this regard, the steering assembly 300 described herein is configured to be used with an outdoor power machine 10, i.e., a ride-on machine (alternatively referred to as a "rider" or "riding machine") or. an outdoor power machine 110, i.e., a stand-on machine (alternatively referred to as a "stander"). This provides an advantage over known outdoor power machines of different stand or ride configurations and that a steering assembly 300 of a single design can be applied to two different machines. This is expected to result in economic savings based on reduced inventory requirements and ease of manufacture, and repair.

The foregoing has described an outdoor power machine. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:

1. An outdoor power machine, comprising:

a chassis;

two or more drive wheel assemblies physically mounted to the chassis, each drive wheel assembly coupled to an electric motor;

an electrical power pack configured to supply electric energy to the electric motors;

one or more steer wheels; and a steering assembly including a body and an axle extending through the body, the body being connected to the chassis by a hinged bracket comprising a first arm attached to the body and a second arm attached to a control pedestal mounted to the chassis, the first arm and second arm connected by a hinge pin such that the first arm and the second arm are configured to pivot relative to each other, the steering assembly configured to pivot relative to the chassis between an inboard use position and an outboard parked position via the hinged bracket, and wherein a steering lever is pivotally mounted to the steering assembly via the axle such that the steering lever can move in a fore-aft direction to control one of the electric motors.

2. The outdoor power machine of claim 1, wherein the steering assembly includes a parking sensor that is configured to generate a signal indicative whether the steering assembly is in inboard use position or the outboard parked position.

3. The outdoor power machine of claim 2, wherein the parking sensor is magnetic.

4. The outdoor power machine of claim 2, wherein the parking sensor is electrically connected to the control system of the outdoor power machine.

5. The outdoor power machine of claim 1, wherein the steering assembly includes a parking spring attached configured such that the steering assembly is biased to the outboard parked position.

6. The outdoor power machine of claim 1, wherein the steering lever is coupled to a sensor configured to generate a signal indicative of the position of the steering lever.

7. The outdoor power machine of claim 6, wherein the steering lever is attached to a pair of opposing balancing springs configured such that the steering lever is biased to a neutral position between the fore and aft positions.

8. The outdoor power machine of claim 6, wherein one steering assembly is provided for each of the left and right sides of the outdoor power machine.

9. An outdoor power machine, comprising:

a chassis;

two or more drive wheel assemblies physically mounted to the chassis, each drive wheel assembly coupled to an electric motor;

an electrical power pack configured to supply electric energy to the electric motors;

one or more steer wheels;

a steering assembly including a body and an axle extending through the body, the body being connected to the chassis by a hinged bracket comprising a first arm attached to the body and a second arm attached to a control pedestal mounted to the chassis, the first arm and second arm connected by a hinge pin such that the first arm and the second arm are configured to pivot relative to each other, the steering assembly configured to pivot relative to the chassis between an inboard use position and an outboard parked position via the hinged bracket, and wherein a steering lever is pivotally mounted to the steering assembly via the axle such that the steering lever can move in a fore-aft direction to control one of the electric motors;

a magnetic parking sensor that is configured to generate a signal indicative of whether the steering assembly is in the inboard use position or the outboard parked position; and wherein the parking sensor is electrically connected to a control system of the outdoor power machine.

10. The outdoor power machine of claim 9, wherein the steering assembly includes a parking spring configured such that the assembly is biased to the outboard parked position.

11. The outdoor power machine of claim 9, wherein the steering lever is coupled to a sensor configured to generate a signal indicative of the position of the steering lever.

12. The outdoor power machine of claim 9, wherein the steering lever is attached to a pair of opposing balancing springs configured such that the steering lever is biased to a neutral position between the fore and aft positions.

13. The outdoor power machine of claim 9, wherein one steering assembly is provided for each of the left and right sides of the outdoor power machine.

* * * * *